(12) United States Patent
Tamaizumi

(10) Patent No.: US 7,503,421 B2
(45) Date of Patent: Mar. 17, 2009

(54) ELECTRIC POWER STEERING APPARATUS

(75) Inventor: Terutaka Tamaizumi, Okazaki (JP)

(73) Assignee: JTEKT Corporation, Osaka (JP)

( * ) Notice: Subject to any disclaimer, the term of this patent is extended or adjusted under 35 U.S.C. 154(b) by 527 days.

(21) Appl. No.: 11/407,006

(22) Filed: Apr. 18, 2006

(65) Prior Publication Data
US 2006/0231325 A1   Oct. 19, 2006

(30) Foreign Application Priority Data
Apr. 18, 2005   (JP)   ............................. 2005-119652

(51) Int. Cl.
*B62D 5/04* (2006.01)
(52) U.S. Cl. ........................... 180/446; 701/42; 701/43
(58) Field of Classification Search ................ 180/446; 701/41, 42, 43
See application file for complete search history.

(56) References Cited
U.S. PATENT DOCUMENTS
2003/0102181 A1 *  6/2003  Tokumoto .................. 180/446
2003/0120404 A1 *  6/2003  Endo ........................... 701/41
2004/0226770 A1 * 11/2004  Nishiyama et al. .......... 180/446

FOREIGN PATENT DOCUMENTS
| EP | 0 737 611 | 10/1996 |
| JP | 8-20350 | 1/1996 |
| WO | WO-2005/026003 | 3/2005 |
| WO | WO-2006/051786 | 5/2006 |

* cited by examiner

*Primary Examiner*—Paul N Dickson
*Assistant Examiner*—Jacob Knutson
(74) *Attorney, Agent, or Firm*—Jordan and Hamburg LLP

(57) ABSTRACT

In an electric power steering apparatus, a steering torque is detected by a torque sensor, and a motor which generates steering assist power is controlled so that steering assist power is generated in accordance with basic assist torque which corresponds to the detected steering torque. The phase of the output signal of the torque sensor is caused to vary by a phase control element. The phase control characteristic of the phase control element is altered in accordance with the judgment results of a steering state judgment element as to whether the steering state is a return steering state or positive steering state, so that, in the frequency response characteristic of the output to input of the torque sensor, the gain at the higher frequency band where the frequency is greater than a set value is reduced in the return steering state in comparison to the positive steering state.

2 Claims, 7 Drawing Sheets

FREQUENCY $\alpha > \beta$
$\omega_1 = 1/2\pi t$
$\omega_2 = 1/2\pi\alpha t$
$\omega_3 = 1/2\pi\beta t$

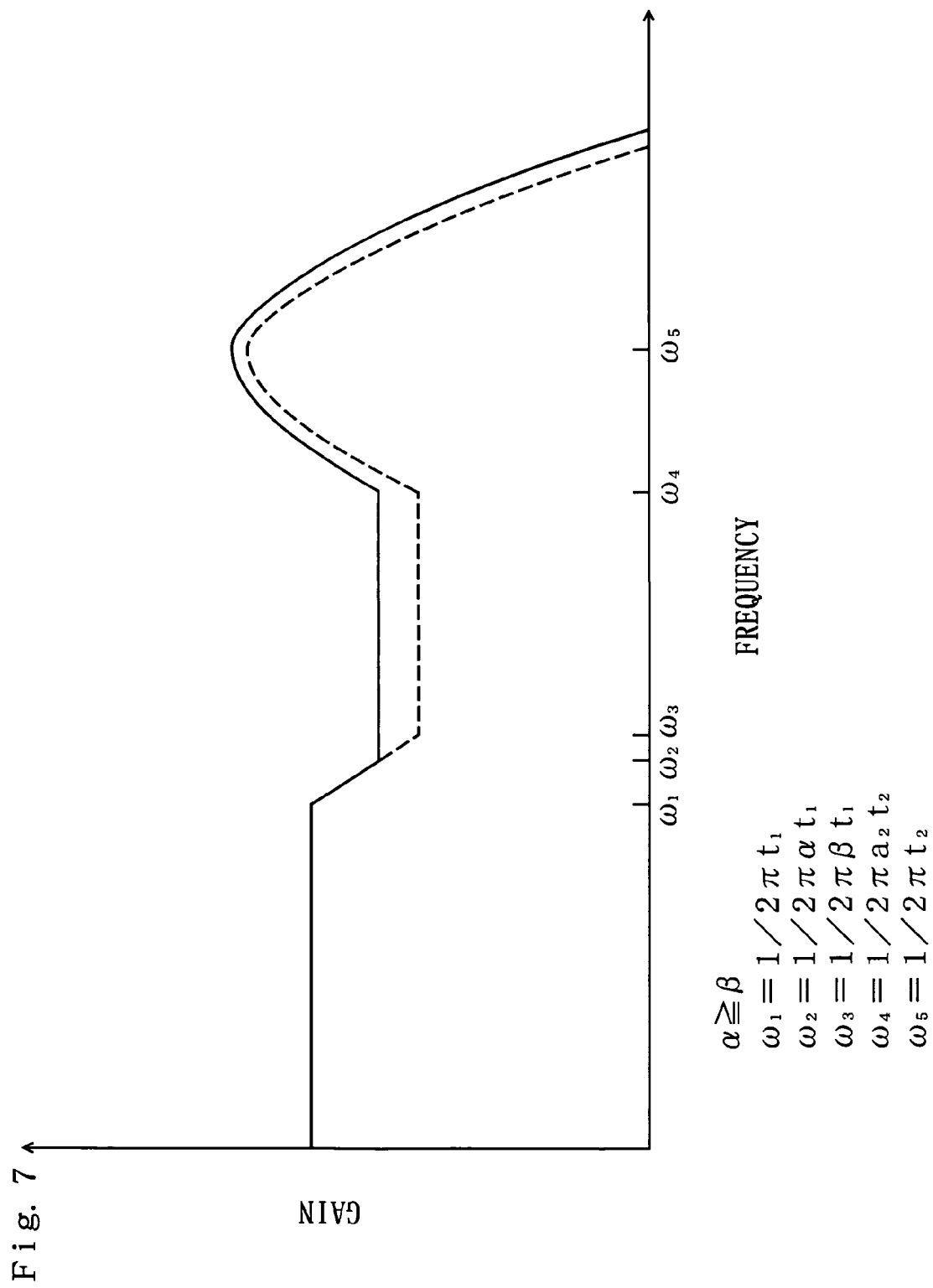

ND OF THE INVENTION

The present invention relates to an electric power steering apparatus which provides a steering assist power by means of a motor.

DESCRIPTION OF THE RELATED ART

In an electric power steering apparatus, a method is used in which the relationship between the steering torque and basic assist torque is stored as assist characteristics, and a motor for generating steering assist power is controlled so that steering assist power is generated in accordance with basic assist torque which corresponds to the steering torque detected by a torque sensor. In the control of the motor, when the deviation between the target value of the motor driving current and the detection value of the motor driving current detected by a current sensor is reduced, the cut-off frequency of a low-pass filter through which the detection signal of the motor driving current passes is set to a larger value in a return steering state in which the steering wheel is steered in the direction toward a straight-forward steering position than in a positive steering state in which the steering wheel is steered in the direction away from the straight-forward steering position. In this way, it is intended that even in a state where the motor generates counter electromotive force as a result of the driver's hands being removed from the steering wheel or the like during the return steering, the high-frequency components of the counter electromotive force are reflected in the control so that the motor driving current can be caused to converge on the target value stably (see Japanese Unexamined Patent Publication No. 1996-20350).

SUMMARY OF THE INVENTION

However, when the steering torque decreases abruptly as a result of the driver's hands being removed from the steering wheel or the like during the return steering, the steering assist power which acts in the positive steering direction also decreases abruptly. Accordingly, the following problem arises, that is, the return of the steering wheel to the straight-forward position becomes abrupt, and the convergence of the motion of the steering wheel deteriorates. It is an object of the present invention to provide an electric power steering apparatus that can solve such problems.

The feature of the present invention is that the electric power steering apparatus comprises a motor for generating steering assist power, a torque sensor for detecting steering torque, means for storing a relationship between steering torque and basic assist torque, means for controlling the motor so that the steering assist power is generated in accordance with the basic assist torque corresponding to the steering torque detected by the torque sensor, a phase control element for the output signal of the torque sensor, and a steering state judgment element for judging whether the steering state is a return steering state in which a steering wheel is steered in the direction toward a straight-forward steering position or a positive steering state in which the steering wheel is steered in the direction away from the straight-forward steering position, wherein the phase control characteristic of the phase control element is altered in accordance with the judgment result of the steering state judgment element so that the gain in the higher frequency band in the frequency response characteristic of the output to input of the torque sensor is reduced in the return steering state in comparison to the positive steering state.

In the present invention, when the phase of the output signal of the torque sensor is altered by the phase control element, the gain in the higher frequency band in the frequency response characteristic of the output to input of the torque sensor is reduced in the return steering state in comparison to the positive steering state. As a result, even if the steering torque acting in the positive steering direction abruptly decreases during the return steering, the abrupt decrease in the basic assist torque corresponding to the detection value of the steering torque detected by the torque sensor can be suppressed. Accordingly, there is no abrupt variation in the steering assist power acting in the positive steering direction during the return steering, and the convergence of the steering wheel is improved.

It is desirable that the relationship between the steering torque and the basic assist torque is set so that assist gradient which is the rate of variation in the basic assist torque to the steering torque varies in accordance with the variation in the detected steering torque, that means for determining the assist gradient corresponding to the detected steering torque is provided, and that the phase control characteristic of the phase control element is altered in accordance with the assist gradient in at least the positive steering state so that the gain in the higher frequency band in the frequency response characteristic of the output to input of the torque sensor is reduced after the increase in the assist gradient in comparison to the gain before this increase.

As a result, when the assist gradient increases in the positive steering state, the phase margin in the open loop characteristic of the output to input of the torque sensor is increased, so that the stability of control can be improved.

According to the electric power steering apparatus of the present invention, the convergence of the steering wheel during the return steering can be improved, and the stability of control can be improved during the positive steering.

BRIEF DESCRIPTION OF THE DRAWINGS

FIG. 7 is a graph showing the frequency response characteristic of the output to input of the torque sensor in the second embodiment of the electric power steering apparatus of the present invention.

DESCRIPTION OF THE PREFERRED EMBODIMENTS

Figure 1:
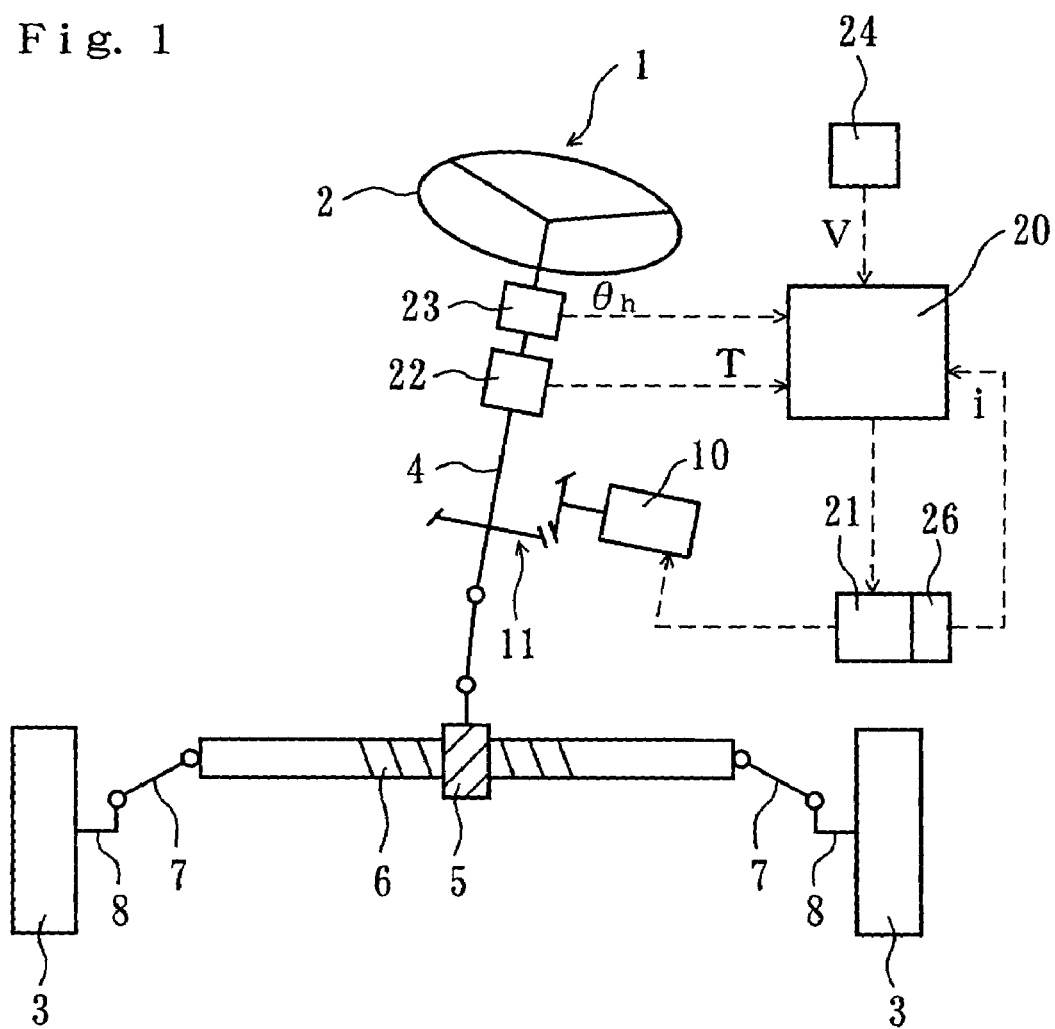
FIG. 1 is a structural explanatory diagram of a first embodiment of the electric power steering apparatus of the present invention.

The vehicle electric power steering apparatus 1 of the first embodiment shown in FIG. 1 comprises a mechanism for transmitting the rotation of the steering wheel 2 caused by steering operation to the vehicle wheels 3 so that the steering angle varies. In the present embodiment, the rotation of the steering wheel 2 is transmitted to a pinion 5 via a steering shaft 4, so that a rack 6 which engages with the pinion 5 is caused to move, and the movement of this rack 6 is transmitted to the vehicle wheels 3 via tie rods 7 and knuckle arms 8 so that the steering angle varies.

A motor 10 is provided to generate steering assist power which acts on the line via which the rotation of the steering wheel 2 is transmitted to the vehicle wheels 3. In the present embodiment, the rotation of the output shaft of the motor 10 is transmitted to the steering shaft 4 via a speed reduction gear mechanism 11, so that the steering assist power is applied.

The motor 10 is connected to a controller 20 constructed from a computer via a driving circuit 21. A torque sensor 22 which detects the steering torque T of the steering wheel 2, a steering angle sensor 23 which detects the steering angle Oh which corresponds to the rotational angle of the steering wheel 2, a vehicle speed sensor 24 which detects the vehicle speed V, and a current sensor 26 which detects the driving current i of the motor 10 are connected to the controller 20.

Figure 2:
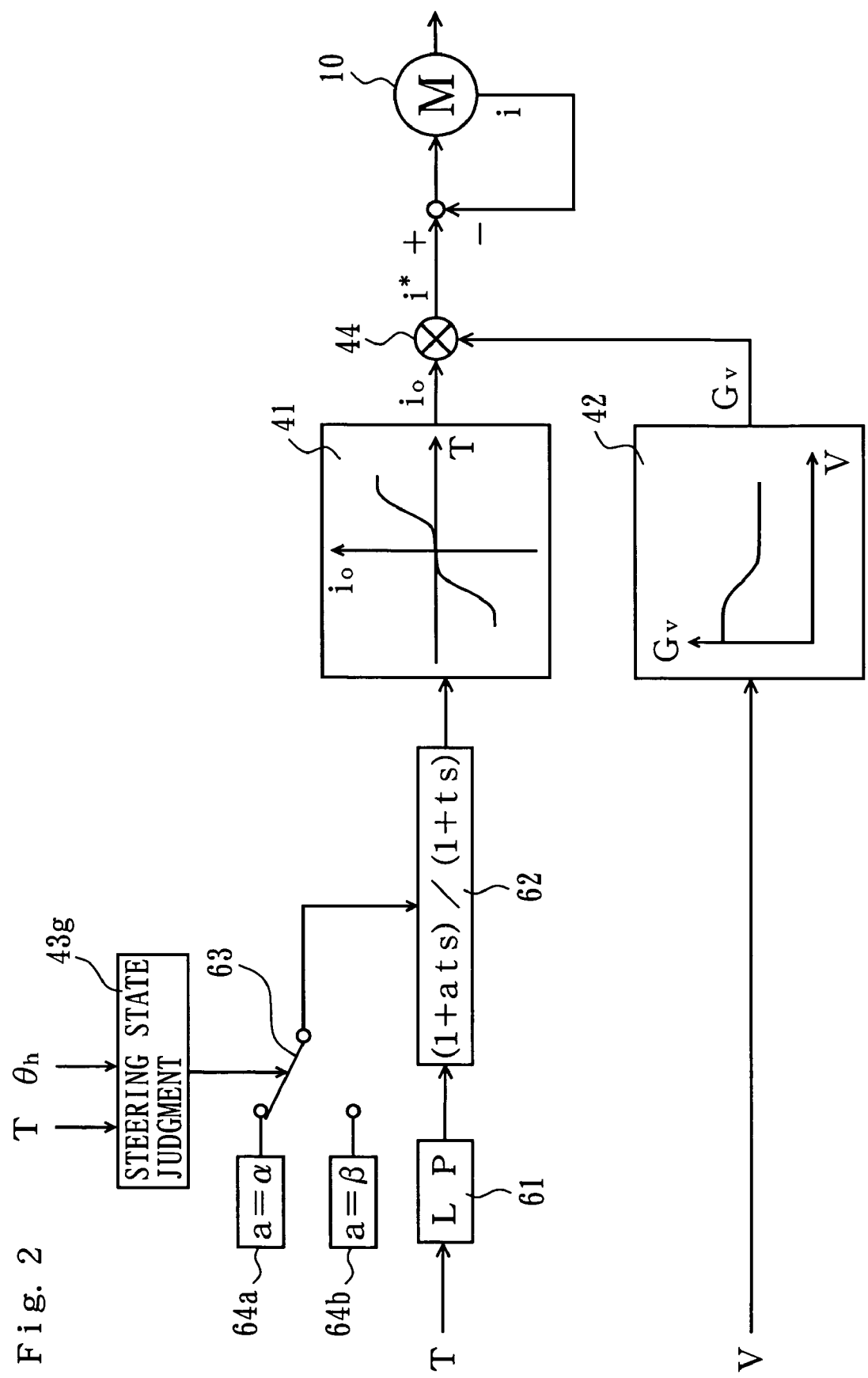
FIG. 2 is a control block diagram of the first embodiment of the electric power steering apparatus of the present invention.

FIG. 2 shows a block diagram of the control of the motor 10 by the controller 20.

The output signal of the torque sensor 22 is input into a calculating part 41 via a low-pass filter 61 and a phase control element 62. Unnecessary high-frequency components are removed from the output signal of the torque sensor 22 by the low-pass filter 61. The phase of the output signal of the torque sensor 22 is controlled by the phase control element 62. For example, the relationship between the steering torque T and the basic assist current $i_o$ is stored as an assist characteristic in the form of a table, calculation formula or the like, and the basic assist current $i_o$ corresponding to the detected steering torque T is calculated in the calculating part 41. For example, as shown in the calculating part 41 in FIG. 2, the relationship between the steering torque T and the basic assist current $i_o$ is set so that the magnitude of the basic assist current $i_o$ increases as the magnitude of the steering torque T increases. The positive and negative signs of the steering torque T and basic assist current $i_o$ are reversed in the case of steering to the right and the case of steering to the left.

The relationship between the vehicle speed V and vehicle speed gain $G_v$ is stored in the form of a table, calculation formula or the like, and the vehicle speed gain $G_v$ corresponding to the detected vehicle speed V is calculated in a calculating part 42. For example, as shown in the calculating part 42 in FIG. 2, the relationship between the vehicle speed V and vehicle speed gain $G_v$ is set so that the vehicle speed gain $G_v$ is greater when the vehicle speed V is small than when the vehicle speed V is large.

Figure 3:
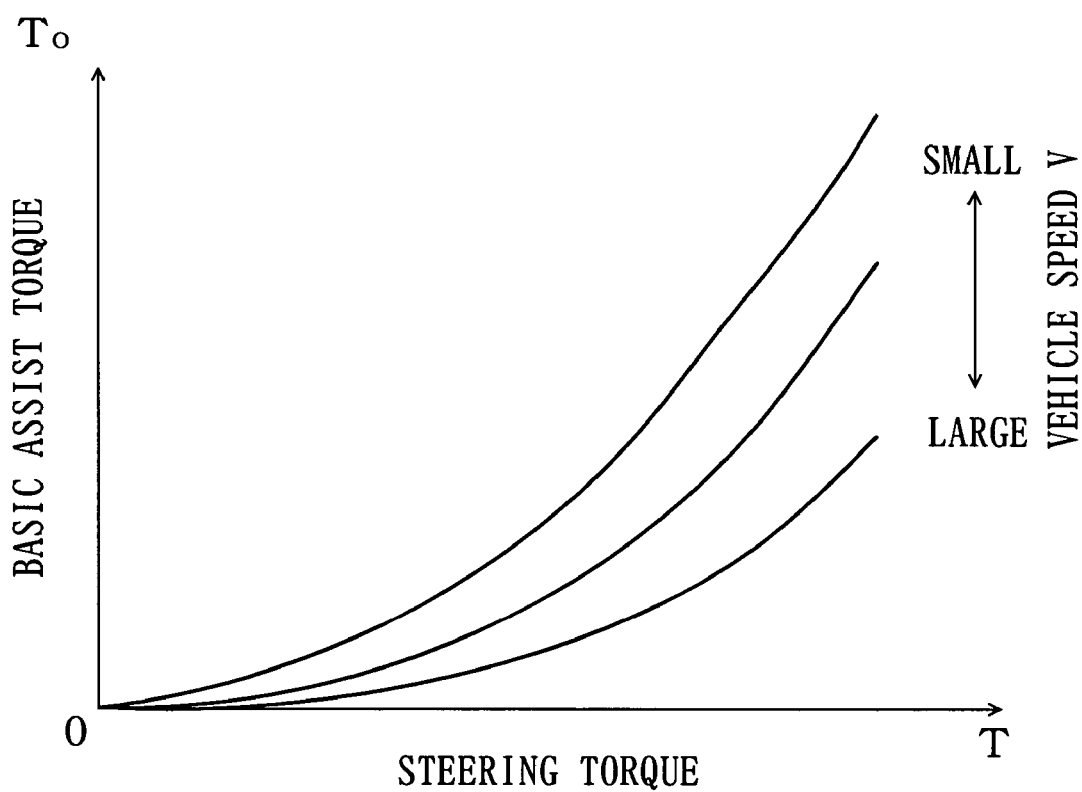
FIG. 3 is a graph showing the relationship between the steering torque, basic assist torque and vehicle speed in the embodiments of the electric power steering apparatus of the present invention.

The product of the basic assist current $i_o$ and the basic vehicle speed gain $G_v$ corresponds to the basic assist torque $T_o$. For example, as shown in FIG. 3, when the vehicle speed V is constant, the magnitude of the basic assist torque $T_o$ increases and the assist gradient ($dT_o/dT$) which is the rate of variation in the basic assist torque $T_o$ to the steering torque T increases with increase in the magnitude of the steering torque T. Furthermore, the basic assist torque $T_o$ varies according to the vehicle speed V. When the steering torque T is constant, the basic assist torque $T_o$ increases and the assist gradient increases with decrease in the vehicle speed V. Specifically, the relationship between the steering torque T and the basic assist torque $T_o$ is set so that the assist gradient varies in accordance with the variation in the detected steering torque T, and this set relationship is stored in the controller 20.

The controller 20 determines the target driving current i* of the motor 10 by multiplying the basic assist current $i_o$ by the vehicle speed gain $G_v$ in a multiplying part 44, and controls the motor 10 by feedback control so that the deviation between the target driving current i* and the driving current i detected by the current sensor 26 is reduced. Specifically, the motor 10 is controlled so that the steering assist power is generated in accordance with the basic assist torque $T_o$ corresponding to the detected steering torque T.

The phase control element 62 of the present embodiment functions as a phase lag compensator, the transfer function Gs of which is expressed by the following equation where s is a Laplace operator, t is a time constant, and a (<1) is a coefficient.

$$Gs=(1+ats)/(1+ts)$$

The phase control element 62 is selectively connected to a first coefficient setting element 64a and a second coefficient setting element 64b via a switch 63. The switch 63 is connected to a steering state judgment element 43g which judges whether the steering state is a return steering state in which the steering wheel 2 is steered in the direction toward the straight-forward steering position or a positive steering state in which the steering wheel 2 is steered in the direction away from the straight-forward steering position. The steering state judgment element 43g of the present embodiment compares the positive and negative signs of the steering torque T, which are reversed in the case of steering to the right and the case of steering to the left, with the positive and negative signs of the rate of variation in the steering angle $\theta_h$, which are reversed when the steering wheel 2 is rotated to the clockwise direction and when the steering wheel 2 is rotated to the counterclockwise direction; in cases where both signs agree, the element 43g judges that the steering state is the positive steering state, while in cases where the two signs do not agree, the element 43g judges that the steering state is the return steering state. The element 43g then outputs a switching signal of the switch 63 in accordance with this judgment.

When the switch 63 is switched in accordance with the judgment that the steering state is the positive steering state, the phase control element 62 is connected to the first coefficient setting element 64a so that the coefficient a in the transfer function Gs is set as a predetermined value α. When the switch 63 is switched in accordance the judgment that the steering state is the return steering state, the phase control element 62 is connected to the second coefficient setting element 64b so that the coefficient a in the transfer function Gs is set as a predetermined value β. The coefficients α and β in the present embodiment are constant, and 1>α>β. Specifically, the coefficient a in the return steering state is smaller than that in the positive steering state.

Figure 4:
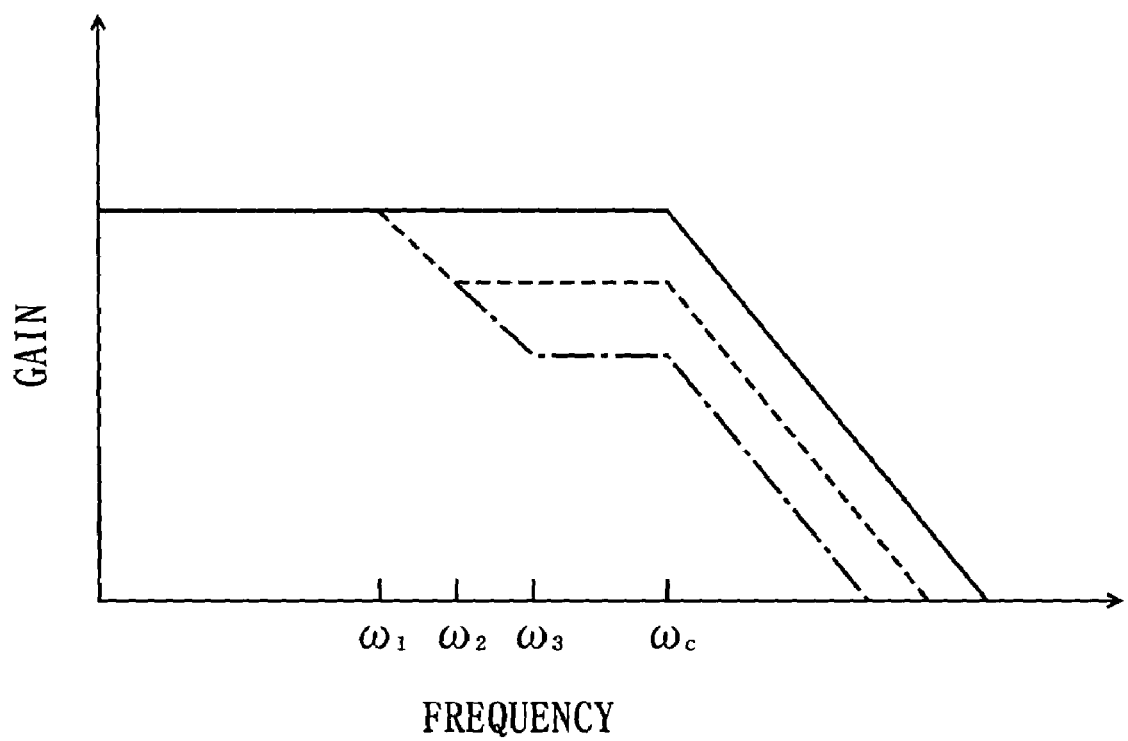
FIG. 4 is a graph showing the frequency response characteristic of the output to input of the torque sensor in the first embodiment of the electric power steering apparatus of the present invention.

FIG. 4 shows the frequency response characteristic of the output to input of the torque sensor 22 in the first embodiment. The horizontal axis indicates the frequency of the output signal of the torque sensor 22, and the vertical axis indicates the gain of the output to input of the torque sensor 22. In FIG. 4, the characteristic in a case where the phase of the signal is not lagged by the phase control element 62 are indicated by a solid line, the characteristic in the positive steering state in which the coefficient a is set as α are indicated by a broken line, the characteristic in the return steering state in which the coefficient a is set as β are indicated by a one-dot chain line, $\omega_1=1/(2\pi t)$, $\omega_2=1/(2\pi\alpha t)$, $\omega_3=1/(2\pi\beta t)$, and $\omega_c$ indicates the cut-off frequency of the low-pass filter 61. Specifically, the phase control characteristic of the phase control element 62 are altered in accordance with the judgment result obtained by the steering state judgment element 43g. As a result, since the phase of the output signal of the torque sensor 22 is caused to vary by the phase control element 62, the gain in the higher frequency band in the frequency response characteristic of the output to input of the torque sensor 22 is reduced in the return steering state in comparison to the positive steering state.

In the abovementioned first embodiment, the breakpoint frequency $\omega_3$ in the return steering state is set by the phase control element 62 so that this frequency is greater than the breakpoint frequency $\omega_2$ in the positive steering state. Accordingly, in the higher frequency band where the frequency is greater than the set frequency, the gain of the output to input of the torque sensor 22 can be reduced to a lower value in the return steering state than in the positive steering state. As a result, even if the steering torque T acting in the positive steering direction abruptly decreases during the return steering; the abrupt decrease in the basic assist torque $T_o$ corresponding to the detection value of the steering torque T detected by the torque sensor 22 can be suppressed. Accordingly, there is no abrupt variation in the steering assist power acting in the positive steering direction during the return steering, so that the convergence of the steering wheel 2 can be improved.

Figure 5:
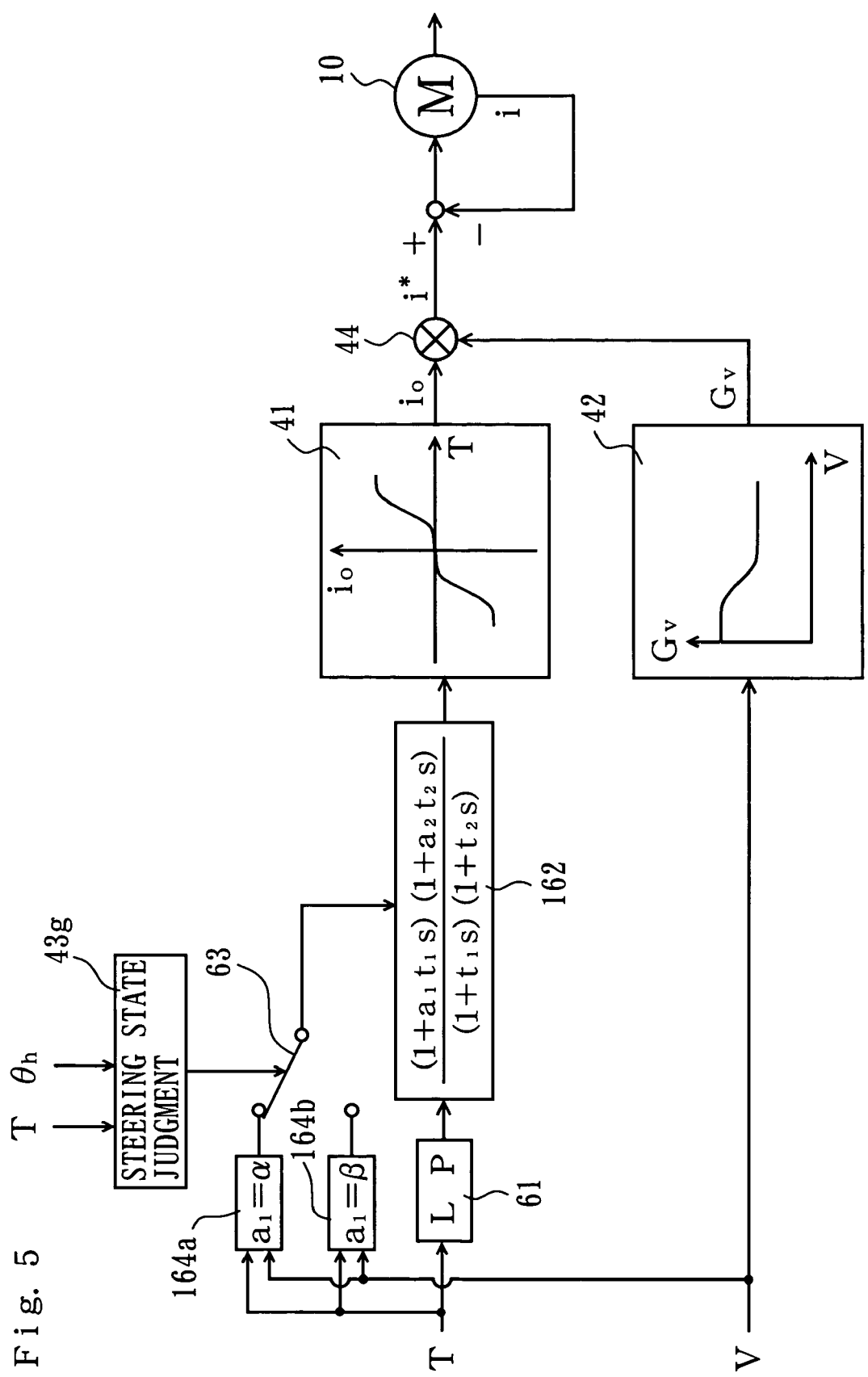
FIG. 5 is a control block diagram of a second embodiment of the electric power steering apparatus of the present invention.
Figure 6:
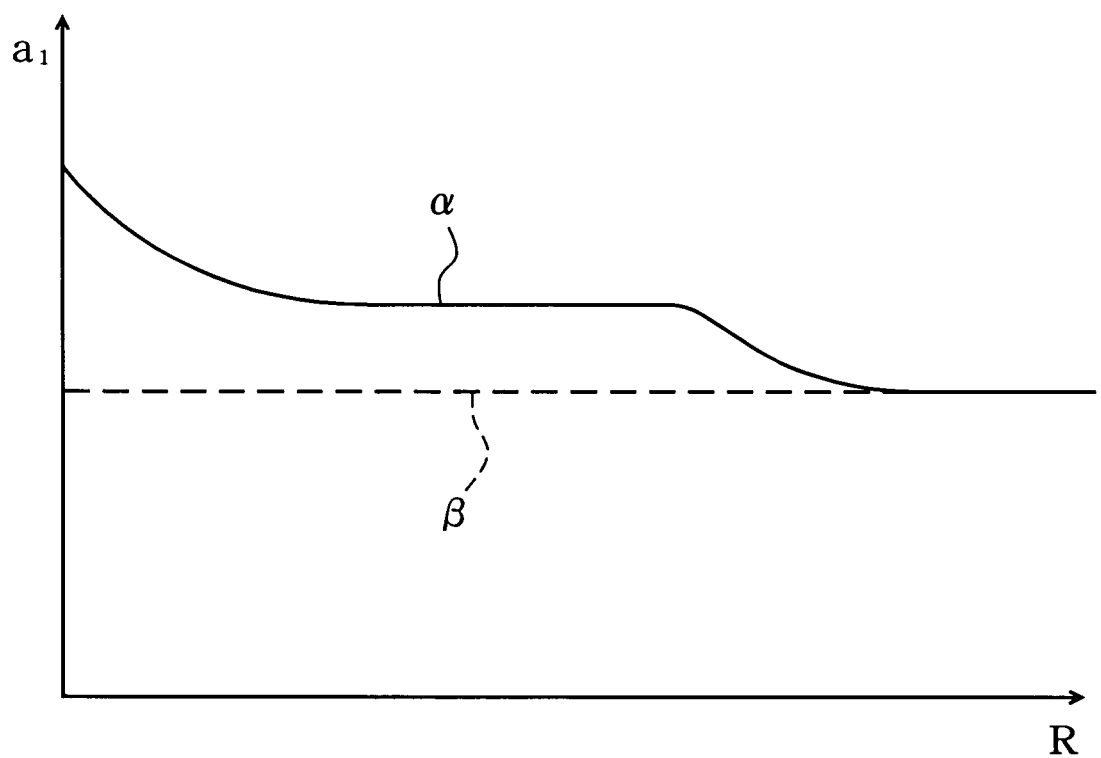
FIG. 6 is a graph showing the relationship between the assist gradient and the coefficients in the phase control element in the second embodiment of the electric power steering apparatus of the present invention.

FIGS. 5 through 7 relate to a second embodiment. Parts which are similar to those of the first embodiment are labeled with the same symbols, and points of difference are described below. The phase control element 162 of the present embodiment functions as a phase lead lag compensator. The transfer function Gs is expressed by the following equation, where s is a Laplace operator, $t_1$ and $t_2$ are time constants, $a_1$ and $a_2$ are coefficients, $t_1 > t2$, $a_1 \leq 1$, and $a_2 \geq 1$.

$$Gs=\{(1+a_1t_1s)(1+a_2t_2s)\}/\{(1+t_1s)(1+t_2s)\}$$

When the phase control element 162 is connected to the first coefficient setting element 164a via the switch 63 in the positive steering state, the coefficient $a_1$ in the transfer function Gs is set as α, and when the phase control element 162 is connected to the second coefficient setting element 164b via the switch 63 in the return driving state, the coefficient $a_1$ in the transfer function Gs is set as β. As shown in FIG. 6, the coefficient $a_1$ in the present embodiment is set as a function of the assist gradient $R=dT_o/dT$, which is the rate of variation in the basic assist torque $T_o$ to the steering torque T, the coefficient $a_1$ $(=\alpha)$ in the positive steering state decreases with an increase in the assist gradient R, the coefficient $a_1$ $(=\beta)$ in the return steering state is set as a constant value which shows no variation even if the assist gradient R varies, and $\alpha \geq \beta$. Specifically, the assist gradient R corresponding to the detected steering torque T is determined by the coefficient setting elements 164a and 164b, and the phase control characteristic of the phase control element 162 is altered in accordance with the determined assist gradient R. As a result, the gain in the higher frequency band in the frequency response characteristic of the output to input of the torque sensor 22 is reduced in the positive steering state after the increase in the assist gradient R in comparison to the gain before this increase. The remaining construction is the same as in the first embodiment.

FIG. 7 shows the frequency response characteristic of the output to input of the torque sensor 22 in the second embodiment. The characteristic in the positive steering state in which the coefficient $a_1$ is set as a is indicated by a solid line, the characteristics in the return steering state in which the coefficient $a_1$ is set as β is indicated by a broken line, $\omega_1=1/(2\pi t_1)$, $\omega_2=1/(2\pi\alpha t_1)$, $\omega_3=1/(2\pi\beta t_1)$, $\omega_4=1/(2\pi a_2 t_2)$, and $\omega_5=1/(2\pi t_2)$. Specifically, the phase control characteristic of the phase control element 162 is altered in accordance with the judgment result of the steering state judgment element 43g and the assist gradient R. As a result, the breakpoint frequency $\omega_3$ in the return steering state is set by the phase control element 162 so that this frequency is greater than the breakpoint frequency $\omega_2$ in the positive steering state. Accordingly, the gain of the output to input of the torque sensor 22 in the higher frequency band in the return steering state can be reduced to a lower value than in the positive steering state. Furthermore, when the assist gradient R increases in the positive steering state, the phase margin in the open loop characteristic of the output to input of the torque sensor 22 is increased so that the stability of control can be improved. Moreover, the system can also be devised so that the coefficient $a_1$ in the return steering state decreases if the assist gradient R increases.

The present invention is not limited to the abovementioned embodiments. For example, the phase control element in the abovementioned embodiments functions as a phase lag compensator or a phase lead lag compensator. However, the present invention is not limited to this. For example, the phase control element can also function as a phase lead compensator, in which the coefficient a (>1) in the transfer function Gs=(1+ats)/(1+ts) of the phase lead compensator is reduced in the return steering state in comparison to the positive steering state. Furthermore, the mechanism for transmitting the rotation of the steering wheel to the vehicle wheels so that the steering angle varies is not limited to the mechanism described in the embodiments; it would also be possible to use a mechanism in which the rotation of the steering wheel is transmitted from the steering shaft to the vehicle wheels via a link mechanism other than a rack and pinion. Furthermore, as long as the transfer mechanism which transmits the output of the motor for generating the steering assist power to the steering system is capable of applying steering assist power, this transfer mechanism is not limited to the mechanism shown in the embodiments. For example, the steering assist power can also be applied by using the output of the motor to drive a ball nut engaged with a ball screw integrated with the rack.

What is claimed is:

1. An electric power steering apparatus comprising:
 a motor for generating steering assist power;
 a torque sensor for detecting steering torque;
 a storing part for storing a relationship between steering torque and basic assist torque;
 a controller for controlling said motor so that the steering assist power is generated in accordance with the basic assist torque corresponding to the steering torque detected by the torque sensor;
 a phase control element for the output signal of said torque sensor; and
 a steering state judgment element for judging whether the steering state is a return steering state in which a steering wheel is steered in the direction toward a straight-forward steering position or a positive steering state in which the steering wheel is steered in the direction away from the straight-forward steering position;

wherein the phase control characteristic of said phase control element is altered in accordance with the judgment result of said steering state judgment element so that the gain in the higher frequency band in the frequency response characteristic of the output to input of said torque sensor is reduced in the return steering state in comparison to the positive steering state.

2. The electric power steering apparatus according to claim 1, wherein the relationship between the steering torque and the basic assist torque is set so that assist gradient which is the rate of variation in the basic assist torque to the steering torque varies in accordance with the variation in the detected steering torque, an assist gradient determination part for determining the assist gradient corresponding to the detected steering torque is provided, and the phase control characteristic of said phase control element is altered in accordance with the assist gradient in at least the positive steering state so that the gain in the higher frequency band in the frequency response characteristic of the output to input of said torque sensor is reduced after the increase in the assist gradient in comparison to the gain before this increase.

* * * * *